United States Patent

[11] 3,630,031

| [72] | Inventor | Lewis M. D. Grainger<br>Route 1, Glen Allen, Va. 23060 |
|---|---|---|
| [21] | Appl. No. | 27,251 |
| [22] | Filed | Apr. 10, 1970 |
| [45] | Patented | Dec. 28, 1971 |

[54] ANTIPOLLUTION SYSTEM FOR INTERNAL COMBUSTION ENGINES
6 Claims, 9 Drawing Figs.

[52] U.S. Cl. .................................................. 60/305, 60/308, 60/298
[51] Int. Cl. ..................................................... F01n 3/10
[50] Field of Search ............................................. 60/30

[56] References Cited
UNITED STATES PATENTS

| 939,844 | 11/1909 | Lehmann ..................... | 60/30 |
| 2,217,241 | 10/1940 | Tendler ...................... | 60/30 |
| 2,295,436 | 9/1942 | Tendler ...................... | 60/30 |
| 2,649,685 | 8/1953 | Cohen ........................ | 60/30 |
| 3,486,326 | 12/1969 | Hermes ....................... | 60/29 |

*Primary Examiner*—Douglas Hart
*Attorney*—Elton H. Brown, Jr.

ABSTRACT: An antipollution system for internal combustion engines in which the air pollutants in the exhaust gases are completely burned to produce an exhaust gas from the engine which is substantially free of air-polluting materials. An air injector is positioned in the exhaust stream to provide the necessary oxygen to burn the pollutants. The exhaust gases are fed through an air injector and combustion chamber unit which is heated by the exhaust gases and remains at a relative high temperature while the engine is operating so as to complete the burning of all air-polluting materials contained in the exhaust gases in the presence of the supplied air. The air is forced-fed by any desired blower and optionally includes air extracted from the crankcase in engines so equipped.

INVENTOR.
LEWIS M. D. GRAINGER,
BY

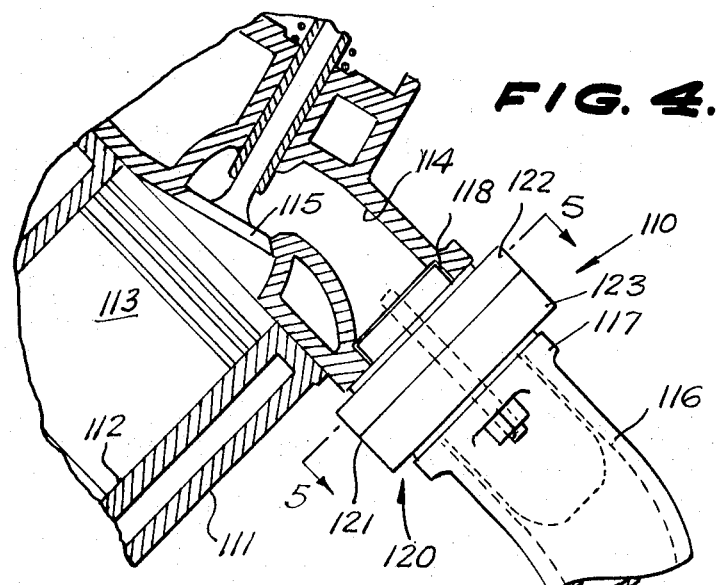
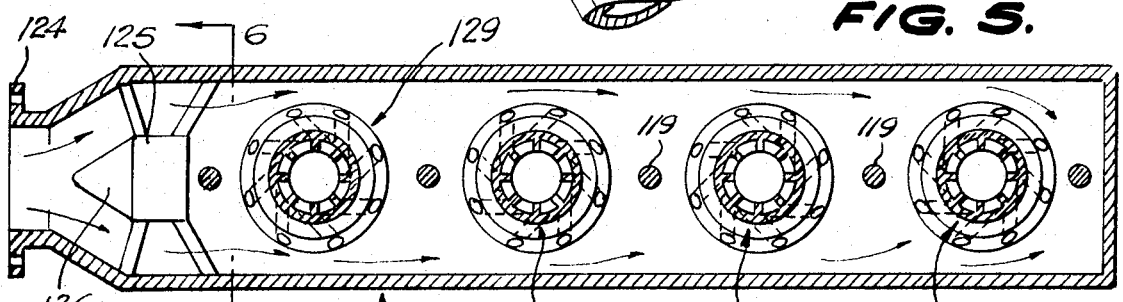
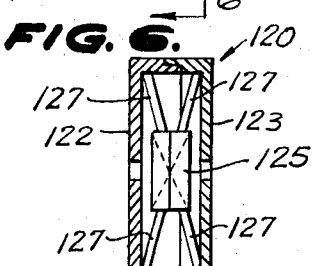
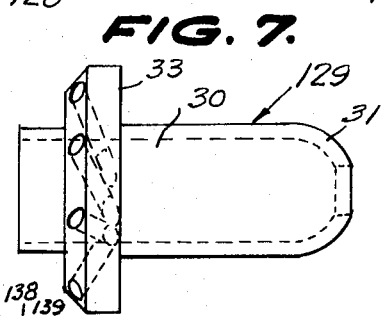
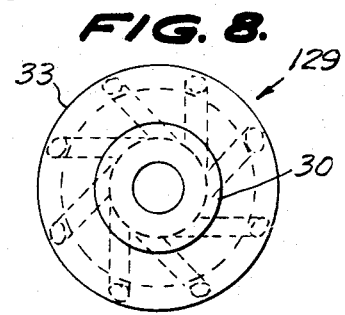
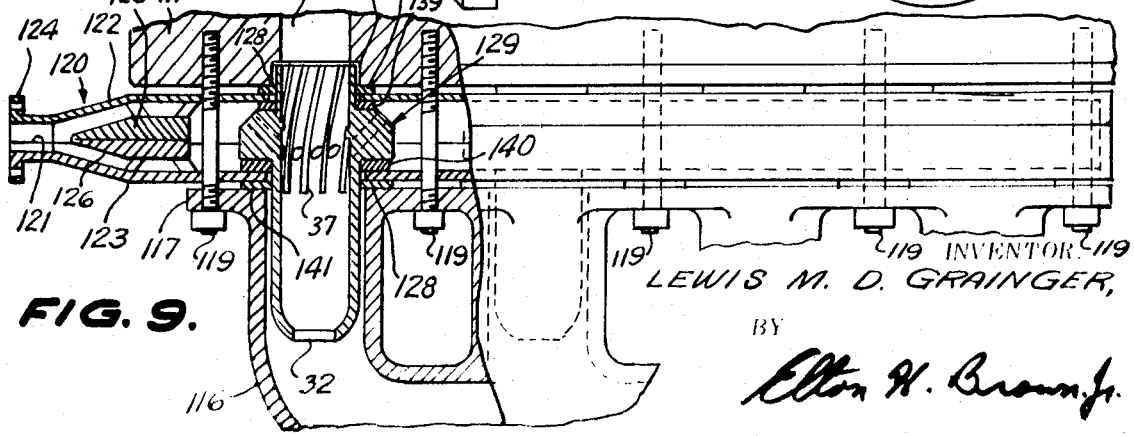
INVENTOR
LEWIS M. D. GRAINGER,
BY
Elton H. Brown Jr.

ANTIPOLLUTION SYSTEM FOR INTERNAL COMBUSTION ENGINES

CROSS-REFERENCE TO RELATED APPLICATION

The system of the present application is adapted to be used with the system of my copending application Serial No. 46,938 filed June 17, 1970 and entitled "Antipollution System for Internal Combustion Engines." While the systems of my copending applications are adapted to be connected together and used with a single engine it should be understood that either system may be used alone.

BACKGROUND OF THE INVENTION

1. Field of the Invention

The present invention is directed to the elimination of air polluting materials in the exhaust gas stream from the internal combustion engine, by burning completely such pollutants.

2. Summary of the Invention

The present invention relates to the elimination of air pollutant materials from an internal combustion engine exhaust stream by supplying additional air to the exhaust gas and completely burning the pollutants prior to admission to the atmosphere.

The primary object of the invention is to provide a system for cooperation with an internal combustion engine to supply air to the exhaust stream and to consume the air pollutants in a combustion chamber.

Other objects and advantages will become apparent in the following specification when considered in the light of the attached drawings.

BRIEF DESCRIPTION OF THE DRAWINGS

FIG. 4 is a side elevation of a modified form of the invention shown attached to one bank of a V8 engine shown partially broken away and in section for convenience of illustration;

FIG. 5 is a longitudinal sectional view taken along the line 5—5 of FIG. 4 looking in the direction of the arrows;

FIG. 6 is a transverse sectional view looking in the direction of the arrows, taken along the line 6—6 of FIG. 5 looking in the direction of the arrows;

FIG. 7 is a side elevation of the air injector and combustion chamber unit removed from the engine;

FIG. 8 is an end elevation of the structure illustrated in FIG. 7; and

FIG. 9 is a top plan view of the structure illustrated in FIG. 4 shown partially broken away and in section for convenience of illustration.

DESCRIPTION OF THE PREFERRED EMBODIMENTS

Figure 1:
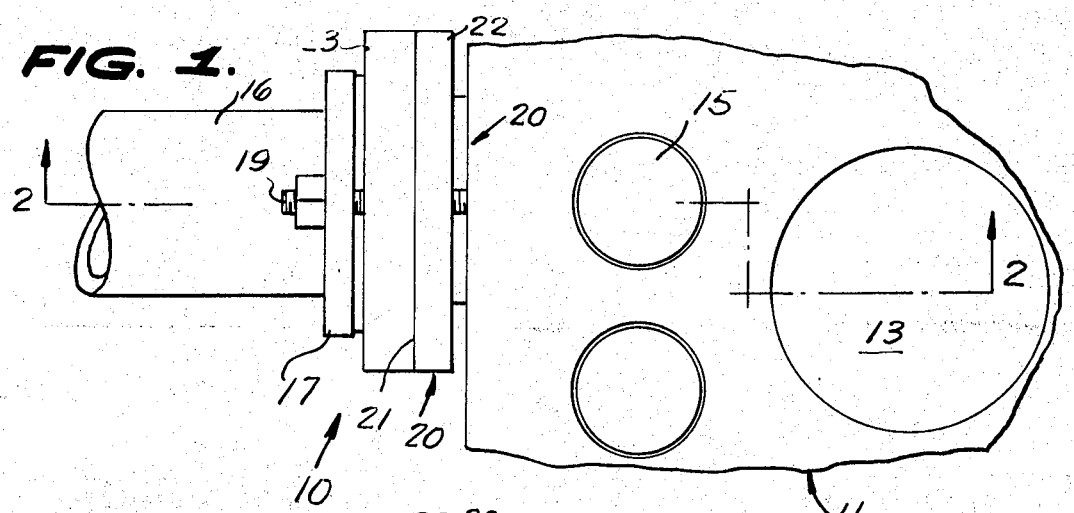
FIG. 1 is a top plan view of the invention shown attached to an internal combustion engine.
Figure 3:
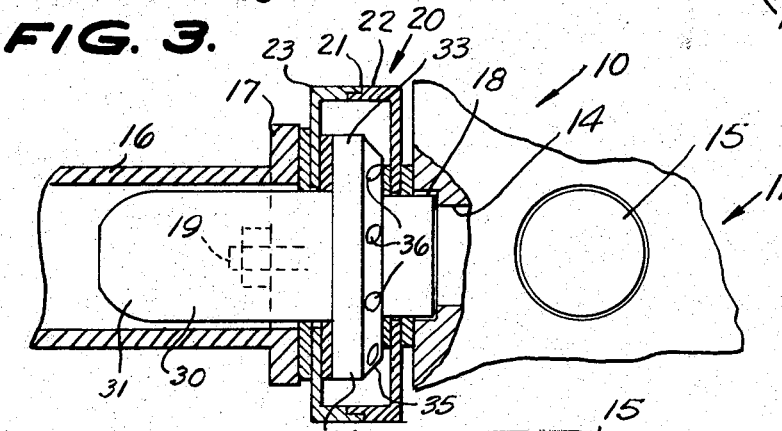
FIG. 3 is a horizontal sectional view taken along the line 3—3 of FIG. 2 looking in the direction of the arrows.
Figure 2:
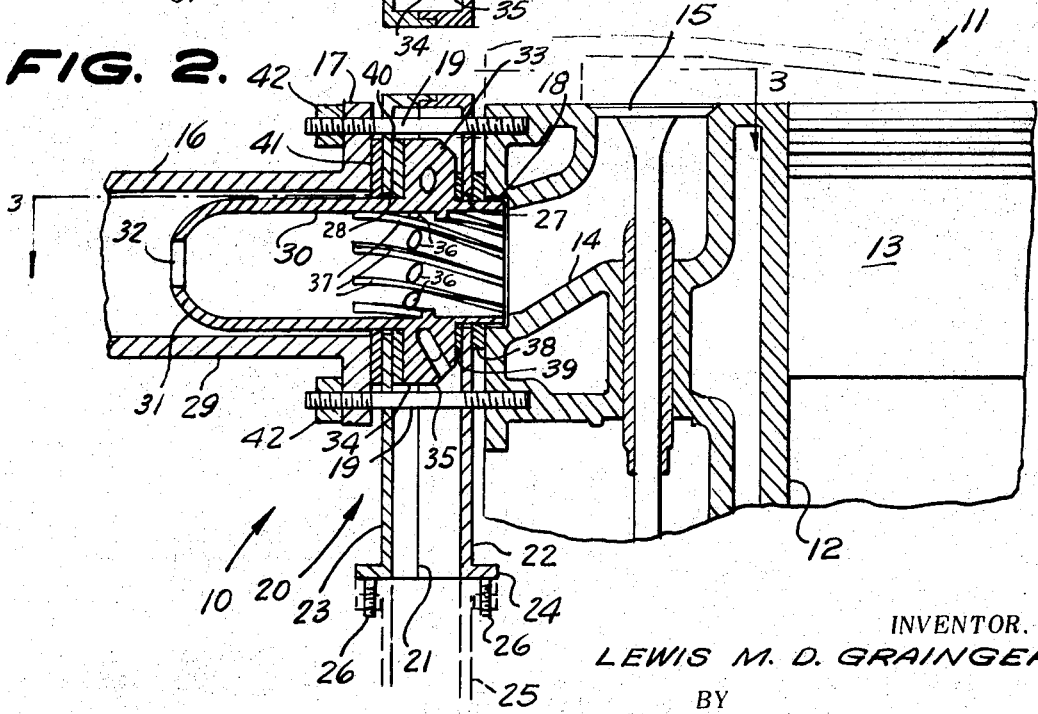
FIG. 2 is a vertical sectional view taken along the line 2—2 of FIG. 1 looking in the direction of the arrows.

Referring now to the drawings in detail wherein like reference characters indicate like parts throughout the several figures the reference numeral 10 indicates generally an antipollution system for an internal combustion engine indicated generally at 11 constructed in accordance with the invention.

The internal combustion engine 11 is of conventional design having one or more cylinders 12 each having a reciprocating piston 13 therein. An exhaust passage 14 controlled by an exhaust valve 15 conventionally permits exhaust gases to pass from the cylinder 12. A conventional exhaust manifold 16 is normally secured to the engine 10 surrounding the exhaust passage 14 to receive exhaust gases therefrom. The exhaust manifold 16 has a flange 17 to receive attachment bolts extending therethrough.

In attaching the present system 10 to the internal combustion engine 11 the conventional exhaust manifold 16 is removed and the conventional stud bolts (not shown) for securing the flange 17 of the exhaust manifold 16 to the engine 11 are also removed. The outer end of the exhaust passage 14 is counter bored at 18 for reasons to be assigned. Attachment studs 19 are then secured to the engine 11 replacing the somewhat shorter original attaching studs. A housing generally indicated at 20 is divided along a line 21 into an inner portion 22 and an outer portion 23. The housing 20 has a flange 24 formed on its lower end for attaching the housing 20 to a metallic flexible air supply conduit 25 secured thereto by studs 26.

The conduit 25 extends to any source of air under pressure desired such as a blower, air compressor or the like and may be attached to the blower of my copending application identified above so as to supply both air and crank case fumes to the housing 20.

The inner portion 22 of the housing 20 has a circular opening 27 extending therethrough and adapted to align with the counter bore 18 of the exhaust passage 14. The outer portion 23 of the housing 20 has a circular opening 28 formed therein in alignment with the circular opening 27.

An air injector and combustion chamber unit 29 has a generally cylindrical body 30 which extends at its inner end into the counter bore 18 in spaced relation thereto. The unit 29 is spaced from the engine 11 so as to prevent the cooling of the unit 29 by the metal of the engine 11. The outer end of the body 30 curves inwardly at 31 and has a central aperture 32 formed therein of a diameter substantially less than that of the cylindrical body 30. An annular member 33 is integrally formed on the body 30 extending radially outwardly therefrom adjacent to but spaced from the inner end of the body 30. The annular member 33 has a cylindrical outer wall 34 joined by a conical wall 35 which tapers inwardly. A plurality of air injector bores 36 extend inwardly from the conical wall 35 into the cylindrical body 30 to permit a flow of air from the housing 20 to pass into the cylindrical body 30. The bores 36 are arranged so as to slope outwardly with respect to the axis of the body 30 and extend at an angle to the radius of the body 30 intersecting the center of the body 30 tangentially. A plurality of spiral vanes 37 are formed in the body 30 at the inner end thereof to provide a swirling action for the exhaust gases passing therethrough.

A heat-resistant nonmetallic sealing gasket 38 surrounds the body 30 between the inner portion 22 of the housing 20 and the engine 11. A heat-resistant nonmetallic sealing gasket 39 is positioned between the inner portion 22 of the housing 20 and the annular member 33. A heat-resistant nonmetallic sealing gasket 40 is positioned between the annular member 33 and the outer portion 23 of the housing 20 and a heat-resistant nonmetallic sealing gasket 41 is positioned between the outer portion 23 of the housing 20 and the exhaust manifold 16.

Nuts 42 on the stud bolts 19 engage the flange 17 and when drawn tight compress the sealing gaskets 38, 39 40, 41 into sealing relation to prevent the escape of exhaust gases except through the unit 29.

In the use and operation of the invention the internal combustion engine 11 is operated in the normal manner with its exhaust gases passing downwardly through the exhaust passage 14 and into the unit 29. The spiral vanes 37 cause these gases to swirl as they pass therethrough mixing completely with the air being forced inwardly through the bores 36. The relatively smaller bore 32 regulates the flow of the exhaust gases so that they are retained momentarily in the unit 29 where all polluting materials are burned. The unit 29 is heated by the exhaust gases and pressure supplied air and remains at a high heat to assist in the burning of pollutants in the exhaust gases. The gaskets 38, 39, 40, 41 are poor conductors of heat and hence the heat of the unit 29 is not dissipated through the exhaust manifold 16 and the engine 11. It should be noted that the cylindrical body 30 is spaced inwardly from the exhaust manifold 16 to further eliminate the dissipation of heat.

It should be understood that either atmospheric air, crankcase ventilation air, or combinations of atmospheric air and crankcase ventilation air may be supplied to the housing 20 as desired.

A modified form of the invention is illustrated in FIGS. 4 through 9 including an antipollution system for internal combustion engines indicated generally at 110. The system 110 is adapted for attachment to a V8 internal combustion engine 111 which includes a plurality of cylinders 1 through 12 each having a reciprocating piston 113 therein.

An exhaust passage 114 extends from the cylinder 112 and is controlled by an exhaust valve 115. An exhaust manifold 116 of conventional design has an attaching flange 117 forming a part thereof. The outer end of the exhaust passage 114 is counter bored at 118.

An elongate air housing generally indicated at 120 is divided along a line 121 into an inner portion 122 and an outer portion 123. The housing 120 is provided with a flange 124 on its open end for connection to a source of air under pressure (not shown). It should be understood that the source of air under pressure may be the blower of my above identified copending application or any other suitable device and may supply atmospheric air, crankcase vent air, or combinations of atmospheric air and crankcase vent air as desired.

An air divider 125 is positioned in the open end of the housing 120 and is provided with a pyramid end portion 126 extending into the air stream to divide the air for distribution. The air divider 120 is supported on a plurality of legs 127 centrally of the housing 120. The inner portion 122 of the housing 120 and the outer portion 123 thereof are each provided with a plurality of circular openings 128 corresponding to the exhaust passages 114 of the engine 111. An air injector and combustion chamber unit generally indicated at 129 is identical to the air injector and combustion chamber unit 29 described in the preferred form of the invention. The units 129 are mounted in the housing 120 on heat resisting sealing gaskets 138, 139, 140 and 141 in the same manner as the unit 29 is mounted in the housing 20.

Elongate stud bolts 119 extend through the flange 117, the housing 120, into the engine 111 to secure the exhaust manifold 116, and the housing 120 as well as the unit 129 in position on the engine 111.

In the use and operation of the invention illustrated in FIGS. 4 through 9 air entering the housing 120 through a reduced cross-sectional opening is divided by the air divider 125 so as to move across the housing 120 along the outside thereof to equally feed the units 129 with air. The operation otherwise of the form of the invention illustrated in FIGS. 4 through 9 is identical to that illustrated in the preferred form of the invention.

It has been mentioned above that the system of the instant invention may be used with engines of the type including a crankcase wherein vent air from the crankcase may be fed to the body 30. It should also be understood that the system of the instant invention is useful with any two-cycle engine.

Having thus described the preferred embodiments of the invention it should be understood that numerous additional structural modifications and adaptations may be resorted to without departing from the spirit of the invention.

What is claimed is:

1. An antipollution system for an internal combustion engine of the type which includes exhaust passages, and an exhaust manifold; comprising an air housing mounted on said engine between said exhaust passages and said exhaust manifold, an air injector and combustion chamber unit having a generally cylindrical cross section mounted in said housing for receiving exhaust gases from said engine, said exhaust gases heating said unit to a relatively high temperature, a plurality of bores extending through said unit to both heat and conduct air from said housing into said unit with said bores sloping to direct air inwardly and spirally in said unit, and means mounting said combustion chamber unit in spaced relation with respect to said engine, said housing and said exhaust manifold to prevent the dissipation of heat from said unit through said engine, said housing and said exhaust manifold.

2. A device as claimed in claim 1 wherein means are provided in said unit for directing the exhaust gases passing therethrough in a spiral path.

3. A device as claimed in claim 2 wherein said means includes a plurality of spiral vanes.

4. A device as claimed in claim 1 wherein said housing extends across a plurality of exhaust passages and is provided with a combustion chamber unit for each exhaust passage.

5. A device as claimed in claim 4 wherein an air divider is mounted in said housing for dividing and directing the air flowing therein for equal distribution to each of said units.

6. A device as claimed in claim 1 wherein said last named means includes a plurality of low heat conducting heat-resistant sealing gaskets.

* * * * *